(12) United States Patent
Momcilovic et al.

(10) Patent No.: US 11,308,644 B2
(45) Date of Patent: Apr. 19, 2022

(54) MULTI-PRESENCE DETECTION FOR PERFORMANCE CAPTURE

(71) Applicant: Weta Digital Limited, Wllington (NZ)

(72) Inventors: Dejan Momcilovic, Wellington (NZ); Jake Botting, Wellington (NZ)

(73) Assignee: WETA DIGITAL LIMITED, Wellington (NZ)

(*) Notice: Subject to any disclaimer, the term of this patent is extended or adjusted under 35 U.S.C. 154(b) by 0 days.

(21) Appl. No.: 17/378,595

(22) Filed: Jul. 16, 2021

(65) Prior Publication Data
US 2022/0067972 A1 Mar. 3, 2022

Related U.S. Application Data

(60) Provisional application No. 63/217,226, filed on Jun. 30, 2021, provisional application No. 63/072,082, (Continued)

(51) Int. Cl.
*H04N 17/00* (2006.01)
*H04N 17/02* (2006.01)
(Continued)

(52) U.S. Cl.
CPC .............. *G06T 7/80* (2017.01); *G06T 7/73* (2017.01); *H04N 17/002* (2013.01); *G06T 2207/30204* (2013.01); *G06T 2207/30244* (2013.01)

(58) Field of Classification Search
CPC ...... H04N 17/00; H04N 17/02; H04N 17/002; G06T 7/80; G06T 7/73; G06T 2207/30204; G06T 2207/30244
(Continued)

(56) References Cited

U.S. PATENT DOCUMENTS 1,070,152 A 8/1913 Mcarthur Jnr
6,324,296 B1 11/2001 McSheery
(Continued)

FOREIGN PATENT DOCUMENTS

WO 2018054338 A1 3/2018

OTHER PUBLICATIONS

Nageli et al., "Flycn: real-time environment-independent multi-view human pose estimation with aerial vehicles", 2018 (Year: 2018).

(Continued)

*Primary Examiner* — Trang U Tran
(74) *Attorney, Agent, or Firm* — Trellis IP Law Group, PC

(57) ABSTRACT

The present description relates relate to recalibration of a sensor device for performance capture, by detecting a miscalibration problem with sensor device and assessment of the problem. A recalibration system includes sensor devices initially calibrated at a recording site. A recording site change occurs and afterwards, a failure to match virtual rays projected from one sensor device with virtual rays projected from the active marker is detected. In response to determining the failure, the active marker is signaled to emit a unique display of light. The failure of the rays to match is assessed based on whether sensor devices capture the unique display of light. Three-dimensional (3-D) coordinates of an active marker is reconstructed from marker data of the calibrated sensor devices. A problematic sensor device is recalibrated based on the assessment, using the 3-D coordinates of the active marker from marker data of the remaining calibrated sensor devices, without stopping the recording.

20 Claims, 11 Drawing Sheets

Related U.S. Application Data filed on Aug. 28, 2020, provisional application No. 63/072,081, filed on Aug. 28, 2020.

(51) Int. Cl.
  *G06T 7/80* (2017.01)
  *G06T 7/73* (2017.01)
(58) Field of Classification Search
  USPC .................................................. 348/180, 187
  See application file for complete search history.

(56) References Cited

U.S. PATENT DOCUMENTS

| | | | |
|---|---|---|---|
| 6,801,637 B2 | 10/2004 | Voronka | |
| 7,629,994 B2 | 12/2009 | Dobrin | |
| 7,720,259 B2 * | 5/2010 | Gordon | G06T 7/246 382/103 |
| 7,856,178 B2 * | 12/2010 | Li | G03B 5/00 396/55 |
| 7,978,224 B2 * | 7/2011 | Dobrin | H04N 21/6405 348/211.11 |
| 9,247,212 B2 * | 1/2016 | Bose | G06Q 10/0833 |
| 9,710,057 B2 * | 7/2017 | Mikhailov | G06T 7/251 |
| 10,133,919 B2 * | 11/2018 | Bose | A63F 13/812 |
| 10,373,517 B2 | 8/2019 | Becker | |
| 10,573,050 B1 | 2/2020 | Liu | |
| 10,593,101 B1 | 3/2020 | Han | |
| 10,657,704 B1 | 5/2020 | Han | |
| 10,701,253 B2 | 6/2020 | Knoll | |
| 10,812,693 B2 | 10/2020 | Estebecorena | |
| 10,845,188 B2 * | 11/2020 | Weiss | H04N 9/04 |
| 10,949,647 B2 * | 3/2021 | Hicks | G06K 9/00255 |
| 11,146,715 B2 * | 10/2021 | Yamagata | B60R 11/04 |
| 2004/0161246 A1 | 8/2004 | Matsushita | |
| 2005/0052553 A1 * | 3/2005 | Kido | H04N 5/3456 348/296 |
| 2005/0105772 A1 | 5/2005 | Voronka | |
| 2008/0246694 A1 | 10/2008 | Fischer | |
| 2009/0270193 A1 | 10/2009 | Stremmel | |
| 2011/0025853 A1 | 2/2011 | Richardson | |
| 2012/0307021 A1 | 12/2012 | Tsai | |
| 2014/0320667 A1 | 10/2014 | Densham | |
| 2015/0336013 A1 | 11/2015 | Stenzler | |
| 2015/0356737 A1 | 12/2015 | Ellsworth | |
| 2017/0177939 A1 | 6/2017 | Beall | |
| 2017/0305331 A1 | 10/2017 | Soehner | |
| 2017/0366805 A1 | 12/2017 | Sevostianov | |
| 2018/0131880 A1 | 5/2018 | Hicks | |
| 2018/0306898 A1 | 10/2018 | Pusch | |
| 2019/0257912 A1 | 8/2019 | Remelius | |
| 2020/0078097 A1 * | 3/2020 | Gregerson | B25J 9/1666 |

OTHER PUBLICATIONS

Chatzitofis et al., "DeepMoCap: deep optical motion capture using multiple depth sensors and retro-reflectors", 2019 (Year: 2019).

* cited by examiner

MULTI-PRESENCE DETECTION FOR PERFORMANCE CAPTURE

CROSS REFERENCES TO RELATED APPLICATIONS

This claims priority from: U.S. Provisional Patent Application No. 63/217,226, entitled "MULTI-PRESENCE DETECTION FOR PERFORMANCE CAPTURE", filed Jun. 30, 2021; U.S. Provisional Patent Application No. 63/072,081, entitled "ACTIVE MARKER STROBING FOR PERFORMANCE CAPTURE COMMUNICATION," filed on Aug. 28, 2020; and U.S. Provisional Patent Application No. 63/072,082, entitled "STROBING BY ACTIVE MARKER GROUPS IN PERFORMANCE CAPTURE," filed on Aug. 28, 2020, all of which are hereby incorporated by reference as if set forth in full in this application for all purposes.

This application is related to U.S. patent application Ser. No. 17/333,883, entitled "ACTIVE MARKERS STROBING FOR PERFORMANCE CAPTURE COMMUNICATION," filed on May 28, 2021; U.S. patent application Ser. No. 17/163,275, entitled "ACTIVE MARKER STROBING FOR PERFORMANCE CAPTURE COMMUNICATION", filed Jan. 29, 2021; U.S. patent application Ser. No. 17/163,276, entitled "STROBING BY ACTIVE MARKER GROUPS IN PERFORMANCE CAPTURE," filed on Jan. 29, 2021; and U.S. patent application Ser. No. 17/332,729, entitled "ACTIVE MARKER DETECTION FOR PERFORMANCE CAPTURE," filed on May 27, 2021 all of which are hereby incorporated by reference as if set forth in full in this application for all purposes.

FIELD OF THE INVENTION

The present disclosure generally relates to virtual productions and more particularly to recalibrating sensor devices for performance capture systems.

BACKGROUND

Virtual productions often combine real and digital images to create animation and special effects. Such virtual productions can include movies, videos, clips, and recorded visual media. Performance capture (also referred to as, "motion capture" or "MoCap") systems may be employed in recording a live action scene to obtain information about a physical object, e.g., an actor, at a recording site. For example, information about a person's shape, movement, and facial expression at any point in the recording may be acquired through performance capture. Data is recorded to establish position, orientation, and/or movement of objects to which the active markers are attached. Data from captured light emitted from active markers positioned on the object in the live scene can be used to create a computer-generated ("CG," "virtual," or "digital") character.

In performance capture, electromagnetic radiation from the active markers is detected by sensor devices and may be in the form of light patches in images. Identification of light patches as representing a particular active marker is needed. Often, sensor devices include filters to exclude some wavelengths of electromagnetic radiation, such as visible light. It can be difficult to interpret light patches in images as coming from particular active markers if the images do not also include visible light, such as the objects to which the active markers are attached.

To create animation using performance capture, three-dimensional (3-D) models are reconstructed from 2-D image data of active markers captured from multiple sensor devices. To reconstruct 3-D position data for a marker, the active marker must be detected by at least two sensor devices at any given time during a shoot. Sensor devices are calibrated so that each sensor device has a reference in 3-D space relative to the other sensor devices. Reconstruction of a captured volume in a scene requires precise calibration of each sensor device for its data to contribute to the formation of 3-D data.

SUMMARY

Implementations of this application relate to recalibration of a sensor device for performance capture, by detecting a miscalibration problem with sensor device and assessment of the problem. A method is provided for recalibrating a sensor device to capture active marker light during a recording associated with a virtual production. According to the method, a first sensor device, second sensor device and third sensor device are provided. Each sensor device is initially calibrated at a recording site to capture marker data for three-dimensional (3-D) coordinates of an active marker. A recording site change occurs and afterwards virtual rays projected from the first sensor device are determined to fail to match with virtual rays projected from the active marker is detected. In response to determining the failure, the active marker is signaled to emit a unique display of light. The failure of the rays to match is assessed based on at least one of the first sensor device, second sensor device, or third sensor device capturing the unique display of light. Without stopping the recording, the first sensor device is then recalibrated based on the assessment, using 3-D coordinates of the active marker from marker data of the second sensor device and the third sensor device.

In some implementations, the failure assessment may include detecting that the first sensor device, the second sensor device, and the third sensor device each capture the unique display of light. The first sensor device is then determined to be miscalibrated and the active marker is in a field of view of the first sensor device. Under these circumstances, the recording site change may include the first sensor device being moved to a changed physical position. Further to this implementation, recalibrating of the first sensor may include calculating the changed physical position of the first sensor device based by applying the 3-D coordinates of the active marker and corresponding two-dimensional (2-D) coordinates of the first sensor device to a perspective-n-point pose problem formula.

In other implementations, the failure assessment may include detecting that the second sensor device or the third sensor device captures the unique display of light and the first sensor device fails to capture the unique display of light. The first sensor device may be repositioned to a changed physical position to have a field of view region that includes the active marker and overlaps with a field of view of the second sensor device or the third sensor device. The repositioning of the first sensor device causes miscalibration of the first sensor device. Under these circumstances, the recording site change may include an initial field of view of the first sensor device in an initial sensor position becoming at least partially occluded.

In some implementations, the recording site change may be a modification of an intrinsic parameter of the first sensor device.

In still some implementations, the process to assess the failure may further include identifying the active marker by the marker data representing the unique display of light emitted by the active marker and captured in particular frames by the first sensor device, the second sensor device, and the third sensor device, when each sensor device is initially calibrated.

A system is also provided for recalibrating a sensor device to capture active marker light during a recording associated with a virtual production. The system comprises components including a first sensor device, a second sensor device, and a third sensor device. Each of these sensor devices are initially calibrated at a recording site to capture marker data for three-dimensional (3-D) coordinates of an active marker. The system components also include a plurality of active markers and at least one computing device comprising one or more processors and a tangible processor-readable storage device including instructions. The instructions include determining failure of virtual rays projected from the first sensor device to match with virtual rays projected from the active marker. The failure is determined after a recording site change. In response to determining the failure, signaling for the active marker to emit a unique display of light. The instructions further include assessing the failure based on at least one of the first sensor device the second sensor device, or the third sensor device capturing the unique display of light. Without stopping the recording, the first sensor device is recalibrated according to the instructions and based on the assessment, using 3-D coordinates of the active marker from marker data of the second sensor device and the third sensor device.

The system and associated instructions may further comprise the above any of the implementation described above with regard to the provided method.

A computer-readable storage medium is also provided, which carries program instructions thereon for recalibrating a sensor device to capture active marker light during a recording associated with a virtual production. The instructions when executed by one or more processors cause the one or more processors to perform operations. Such operation comprises receiving initial calibration information for a first sensor device and a second sensor device, each sensor device initially calibrated at a recording site. Three-dimensional (3-D) coordinates of an active marker are determined from marker data of the calibrated first sensor device and second sensor device. After a recording site change, determination is made of a failure to match virtual rays projected from the first sensor device with virtual rays projected from the active marker. In response to determining the failure, signaling for the active marker to emit a unique display of light. The failure is assessed based on at least one of the first sensor device or the second sensor device capturing the unique display of light. The first sensor device is recalibrated based on the assessment, using the 3-D coordinates of the active marker and without stopping the recording.

The computer-readable storage medium may further include program instruction for any of the implementations as described above with regard to the provided method.

A further understanding of the nature and the advantages of particular implementations disclosed herein may be realized by reference to the remaining portions of the specification and the attached drawings.

BRIEF DESCRIPTION OF THE DRAWINGS

Various implementations in accordance with the present disclosure will be described with reference to the drawings.

FIGS. 2a, 2b, and 2c are illustrations of examples of a recording site, in accordance with some implementations, in which FIG. 2a shows calibrated sensor devices detecting active markers, FIG. 2b shows an occluded sensor device, and FIG. 2c shows the occluded sensor device of FIG. 2b in a moved position.

DETAILED DESCRIPTION

Figure 1:
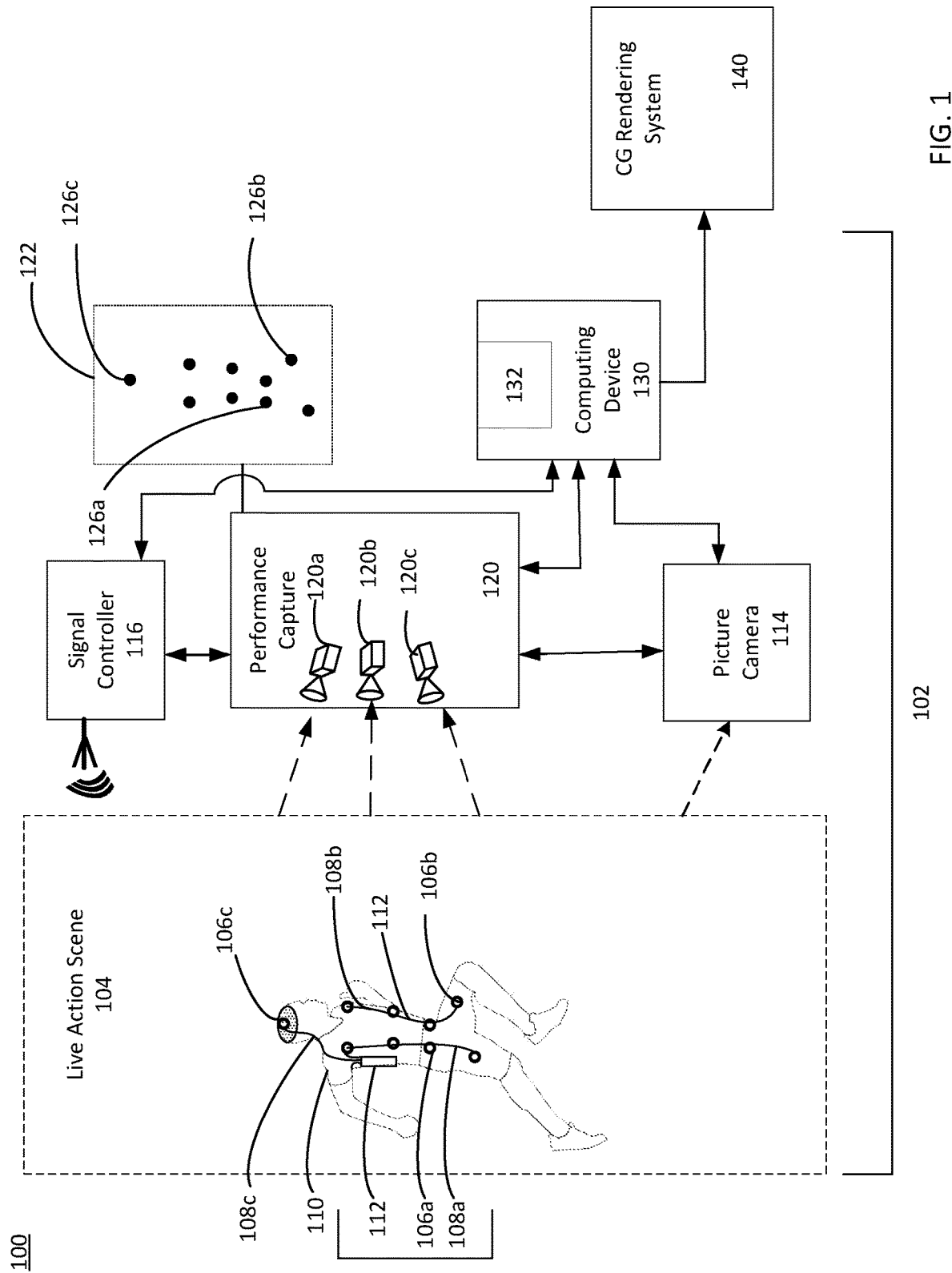
FIG. 1 is a conceptual block diagram illustrating an exemplary environment for capturing live action data for creating animation with a virtual production system, in accordance with some implementations.

In the following description, various implementations will be described. For purposes of explanation, specific configurations and details are set forth in order to provide a thorough understanding of the implementations. However, it will also be apparent to one skilled in the art that the implementations may be practiced without the specific details. Furthermore, well-known features may be omitted or simplified in order not to obscure the implementation being described.

The present recalibration system for performance capture enables on the fly recalibration of sensor devices, which become amiss during recording of a live action scene at a recording site for a virtual production. The recalibration system further enables detection of the problematic sensor devices that have become miscalibrated, and assessment of the problem.

Techniques for reconstruction of a captured volume in the scene require precise calibration of sensor devices for data to contribute to the formation of 3-D data. Multiple calibrated sensor devices are required to detect active markers and reconstruct 3-D data from the 2-D data collected by the sensor devices. The process of reconstruction is sensitive to any changes in the sensor devices during recording that results in miscalibration of the sensor device.

When sensor devices are calibrated according to the recalibration system, virtual rays projected from the sensor devices intersect with virtual rays projected from one or more active markers located in the live action scene. Three-dimensional (3-D) coordinates of the active markers may be determined with data captured by at least two calibrated sensor devices detecting an active marker in overlapping portions of respective fields of view of the sensor devices.

Miscalibration of a sensor device may be indicated should mismatching of the rays occur.

To address a miscalibration problem, a particular active marker may be directed to flash a unique sequenced pattern of light for identification of the active marker. The recalibration system may assess the situation by determining which sensor device captures the unique pattern and therefore the particular active marker. In some implementations, the particular active marker may be momentarily directed to emit light and other active markers at the recording site may be directed to refrain from emitting light. The problematic sensor device is recalibrated with known data based on the assessment, without stopping the recording of the scene during the production shoot.

An occurrence of recording site changes can alter the collection of marker data for 3-D calculations of active markers. Miscalibration may occur, for example, due to movement of the sensor device, occlusion of the sensor device's field of view, drift of the sensor device to a threshold amount, changes to intrinsic camera parameters, such as focal length, optical center, principal point, skew of axis, lens distortion, etc. Such changes may result in unusable sensor device data that does not contribute to reconstruction.

Once calibrated, sensor devices are typically kept stationary at a recording site to maintain their calibration. The process of reconstruction is affected by any changes in the sensor devices during recording that results in miscalibration of the sensor device. When a sensor device fails to provide the expected marker data, the problem needs to be assessed to remedy the situation. For example, the problem may reside with the sensor device not capturing active marker light due to an obstruction blocking at least a portion of a field of view. Sensor devices, such as occlude sensor devices, may be moved to restore, maintain, or otherwise improve capture of marker data. A problematic sensor device may also include a sensor device that was intentionally moved, for example, to record a moving object or to compensate for another problematic sensor device.

Movement of sensor devices typically results in miscalibration. Some minor sensor device movements, such as bumping of the sensor device, may result in the sensor device still capturing light from an active marker while the sensor device is miscalibrated. In some instances, miscalibration of a previously calibrated sensor device may be due to drift or due to manual, automatic, or accidental adjustment to intrinsic camera parameters, such as changing a lens.

A miscalibrated sensor device, for purposes of this description, refers to a sensor device that had been previously calibrated at a recording site and the calibration becomes amiss due to a change that occurs. Previous calibration prior to recording of the scene during the production shoot may be performed by various known calibration techniques, such as use of a waving wand with markers emitting light. A sensor device that is in a changed physical position refers to a different location, orientation, angle, and/or direction, from an initial position of the sensor device when the sensor device was in a calibrated state.

When a problem arises that affects calibration of a sensor device during a shoot, some prior systems may be limited in adjustment for minor error thresholds, e.g., 1-2 pixels off, for example associated with drift. Such recalibration by other systems may take place in post-production rather than during the shoot. When larger errors, e.g., 5, 6, 10, 20 pixel errors, occur with these other systems, the resulting data may not contribute to reconstruction. Other systems may require the virtual production to be temporarily stopped to recalibrate using a waiving wand techniques that enable calibration based on known light sources. Such stoppages result in increased production time and costs. If there are additional calibration problems during production, further stoppages can add to wasted time and cost.

The present recalibration system addresses these drawbacks and provides for detection of problematic sensor device for on the fly recalibration of the sensor device during recording at the production shoot without the need to stop recording. For example, the present techniques to match captured light data with particular active markers during recording of the scene, provides sufficient data to avoid recalibrating with external sources such as a waiving wand.

The present recalibration system predicts which images during a recording session are expected to include representations of captured light of the particular identified active markers. Marker data from overlapped fields of view of sensor devices may be compared. If one or more active markers in an overlapping portion of a field of view is not detected by a suspect sensor device, it may be determined that the lack of detection is due to a problematic sensor device. Active markers may be identified according to patterns of light unique to one active marker or specific groups of active markers. The recalibration system may predict the active markers light images that should appear in particular frames of each sensor device. If, for example, a sensor device does not generate the anticipated marker data in the expected frames from capturing an overlapping region during the production shoot, but at least one other sensor device successfully captures the marker data in the expected frames, the suspect sensor device may be amiss. The recalibration system collects and analyzes the marker data from the sensor devices in real time during the production shoot, enabling prompt detection of problems.

The sensor device is synchronized with the light emitted from the active markers according to a predetermined pulse pattern. In addition to predicting which captured frames of each sensor device should include particular patches of light, the recalibration system further includes information as to where the patches should be in target images for each sensor device calibrated with other sensor devices. In addition, by using marker data of correctly calibrated sensor devices pointing at an active marker, the recalibration system provides information to predict where the light patch from a same active marker should fall in the images of other sensor devices. In some implementations, during recalibration of a problematic sensor device, the recalibration system uses information from calibrated other sensor devices capturing active markers in the overlapping region to extract a new position and orientation of the problematic sensor device. In one example, perspective-n-point formula technique is used with 3-D coordinates from two or more calibrated sensor devices and corresponding 2-D data in the uncalibrated sensor device. New position data for the uncalibrated sensor device is calculated.

To solve for intrinsic based miscalibrations of a sensor device, additional data captured from identified active markers of the scene in a frame may be used for an optimization problem, e.g., to complete a projection matrix, and recalibrate the miscalibrated sensor device. Such additional data may be retrieved by the recalibration system identification of an active marker and knowledge of which frames should include the identified marker.

As long as at least two sensor devices are calibrated at any given time and there is at least one overlapping field of view region between any two sensor devices, any sensor devices may be intentionally moved to optimize the capture of marker data. For example, when objects with markers are moved in the scene to compensate for another moved sensor device. In some implementations, additional sensor devices may be added to record a scene and the new sensor devices may be calibrated on the fly according to the present recalibration techniques without pausing the recording.

The recalibration system may also recalibrate the problematic sensor device in a new physical position, on the fly, by comparing its marker data to the other calibrated sensor devices' marker data. The recalibration system may extrapolate position data based on one detected active marker of a group of active markers. For example, if one active marker in a group is detected by a calibrated sensor device and the problematic sensor device picks up on the at least some of other markers in the group, known distance and spatial orientation between active markers in a known group of active markers may be used to determine the new position of the problematic sensor device. The recalibration system may be a component of a virtual production system. Various components of the virtual production system may include: (1) live action components of a recording site, such as a data capture system for generating visual data from a scene including the described recalibration system for performance capture, which may include one or more computing devices, sensor devices, active markers, a signal controller, and picture camera(s); (2) virtual production components for generating CG graphic information based on the visual data; and (3) content compositing components for generating output images. Any of the system components may communicate with the other components through a network, radio frequency signals, emitting of electromagnetic radiation, or other data transfer technologies.

FIG. 1 is a block diagram of an example environment for capturing live action data for creating animation with a virtual production system 100 employing a recalibration system, which includes performance capture system 120 (including sensor devices 120a, 120b, 120c), computing device 130, and active markers 112, as described herein. The virtual production system 100 is a representation of various hardware and computing resources that can be used to perform the process actions and steps described herein. Any number and type of discrete or integrated hardware and software components, such as program instructions carried in a non-transitory computer readable storage medium, may be used to perform the methods described. The components may be located local to, or remote from the other system components, for example, interlinked by one or more networks, radio frequency communication, etc.

The live action scene 104 defines the space available for recording at a recording site and may include a set, a performing stage, a location of an event or activity, a natural outdoor environment, etc. Implementations of a data capture system 102 includes the performance capture system 120 to detect light emitted from active markers 112 in the live action scene 104 and generate marker data 122. The performance capture system 120 may communicate with recalibration module 132 of computing device 130 to detect potentially problematic sensor devices, assess sensor device problems, and recalibrates the problematic sensor devices. The live action scene 104 includes a capture volume in which the sensor devices 120a, 120b, 120c detect electromagnetic radiation, e.g., light, emitted by one or more active markers 112. The data capture system 102 further includes a signal controller 116 to send instructions that direct the active marker 112, a picture camera 114 to capture visual data from the live action scene 104, and a computing device 130 to define light patterns, analyze the various captured data, identify problematic sensor devices, and recalibrate sensor devices. For purposes of this descriptions, components of the recalibration system may include the computing device 130 with recalibration module 132, the sensor devices 120a, 120b, 120c, one or more active markers 112, the signal controller 116, and combinations of components thereof, including additional components not shown in FIG. 1.

During a pre-capture phase, the live action components are synchronized in time, e.g., by a time code, for coordinated data capture. as described in detail later in this description. Further in the pre-capture phase, sensor devices are positioned in the recording site and calibrated.

Software may be used to define a signature pattern for a particular group of active markers, for example, by computing device 130. The signature pattern is based on a time code and frame rate of the sensor devices, e.g., dedicated cameras, of the performance capture system 120. The signature pattern dictates particular frames within specific time slices that are to be exposed with light (referred to as illuminated frames) and frames that are to be unexposed (referred to as blank frames). Thus, the pattern includes timing elements so that the control unit may time the powering of active markers and the light will be emitted in particular time slots of the sensor device of the performance capture system. The signature pattern determines duration of light pulses and gap periods between light pulses by active markers. Typically, the amplitude or intensity of light remains constant. In various implementations, the pattern provides for light to be emitted when a capture device shutter is open and no light is to be emitted when the capture device shutter is closed. In some implementations, the duration of light pulses is uniform, such that intensity variations are not factors in the detection of the signature pattern.

The signal controller 116 receives pattern information that define the pattern including timing of the light pulses, e.g., from the computing device, for any given group of active markers. The signal controller encodes and converts the digital pattern data to analog signals. The signal controller may amplify the signal to a higher power level and feeds the signals to an antenna for transmission in the form of electromagnetic waves in the air. In some implementations, the signal controller 116 may include a radio frequency transmitter that transmits radio frequency waveform signals. However, other forms of data transmission are possible, such as IR transmission. In still some implementations, a light pattern may be set at the control unit 112 and the data capture system 102 may not require a signal controller 116 to convey the light pattern to the control unit 112.

The active markers may be placed in the live action scene at a distance that enables receiving of signals by the active marker from the signal controller 116 and detection of light from the active marker by the performance capture system 120. For example, the active marker may be located up to 50 m from the signal controller 116.

In some implementations, a control unit of an active marker apparatus, for example, worn on the actor 108a, may include a receiver to collect the signals from the air via an antenna. As there may be many types of electromagnetic waves in the air, the control unit may filter out the desired signal. The signal may be amplified and fed to the analog to digital converter, which converts the analog signal to digital signal. These digital signals may be demodulated and pattern information decoded. The control unit regulates the groups of active markers (106a, 106b, 106c) to emit light according to the pattern information. For example, the control unit may transfer electrical power in pulses in line with the pattern, to the active markers through wired strands (108a, 108b, 108c) that connect groups of active markers (106a, 106b, 106c).

As shown in FIG. 1, three groups of active markers may be coupled to individual strands: four active markers 106a attached to the right front torso of the actor and coupled to strand 108a, four active markers 106b attached to the left front torso of the actor and coupled to strand 108b, and a single active marker 106c attached to the head of the actor and coupled to strand 108c. Each active marker within a group operates at a same frame rate according to the signature pattern assigned to the group.

The actor 110 may have any number of groups coupled to one or more control units 112. Groups of active markers include at least one active marker, such as two or more active markers, e.g., 2-8 active markers. For example, each group may consist of eight (8) markers, each coupled to a strand. The actor may have eight (8) groups extending to various parts of the actor 110. Although an actor is depicted in FIG. 1 for illustration purposes, the active markers may be attached to various types of live or inanimate objects in the live action scene 104, such as props, animals, cameras, other actors, etc. In some implementations, the active markers may be held by receptacles that attach the active markers to the object. Stands may be positioned underneath or on top of a wearable article. In some implementations, some active marker may be positioned directly on the person 110, such as with adhesive, rather than a wearable article.

In various implementations, the strand 108 may include wires that run inside the length of a flexible tube or sleeve, e.g., in a conduit in the strand, heat shrink tubing, protective wrap or tape, coating over the wires, etc. Other forms of the strand may be possible for wired communication to and/or from active markers, e.g., to control pulsing of light be the active marker via a control unit. In some implementations, the strand may be one or more wires, e.g., bare wires, embedded within a protective material of the wearable article.

In some implementations, wireless active markers may be employed that are independently controlled with an on-board input/output interface to receive wireless sync signals via a wireless format, such as from signal controller 116 and/or control unit 112. The wireless active marker may also include logic. In these implementations, the active markers may not employ a strand for electronical control of the active markers. In some implementations, wireless active markers with on-board receivers communicate directly with the signal controller 116 without the need for the control unit 112.

In various implementations, all active markers in a group, such as active markers coupled to a strand and positioned in an area of an object, may emit a same pattern. In some implementations, different groups on a same object or groups on different objects may each emit distinctive signature patterns of light to which each are assigned. Identification of one reference active marker or one reference group of active markers may allow the data capture system to identify other markers.

The computing device 130 may determine and/or include prior knowledge of spatial relationships among the active markers relative to each other. Such knowledge may be used in identifying markers based on detecting light patterns from other groups of active markers. Such grouping of active markers may provide advantages over needing to identify each marker by its own pattern. For example, individual marker tracking may require excessive resources to detect and analyze each marker. In some implementations, recalibration module 132 may be part of the computing device 130. In still some implementations, recalibration module 132 may be a component of a separate computing device, e.g., dedicated to recalibration of the performance capture system 120, in communication with the computing device 130. In such configurations, computing device 130 may feed information, e.g., active marker identification data, to the recalibration module 132.

The light source of the active marker (106a, 106b, 106c) may be infrared LED, e.g., between 700 nm and 1 mm, or more specifically between 800 nm and 960 nm. For example, the light source can be a 940 nm wavelength, 1 watt infrared (IR) LED. However, other light sources are possible, such as ultraviolet light source and the sensor device is an ultraviolet detector. In some implementations, various wattage light sources may be employed depending on the live scene of the shoot. For example, higher wattage may be used when shooting in bright daylight and lesser wattage for dark scenes.

In some implementations, a different wavelength of light or filters, or combinations of different wavelengths may be used for various different markers in a scene or at certain times during a shoot. In some implementations, varying of wavelengths of light may enable further communication by the active markers for detection. For example, active markers may strobe a change in wavelength to indicate low battery power or other events that require attention. Different groups of active markers may strobe particular different wavelengths to further indicate its location in a scene or the object bearing the active markers. In this manner, various information in addition to identification of the active markers, may be encoded in the sequences and patterns of light being emitted by the active markers.

Furthermore, varying the wavelength of light by active markers may facilitate detection under various conditions that favor a certain wavelength, such as fog, and based on a resolution and optical contrast required to produce the data needed by the CG rendering system 126 for animation. For example, active markers that emit blue wavelength light may be used for water settings. In some implementations, specialized environmental sensors within components of the data capture system, e.g., the control unit and the signal controller, may detect a change in environment that necessitates a different light wavelength. In response, the active markers may be instructed to change the light accordingly. In situations where wavelengths of light vary, the performance capture system may include sensors that filter for the various wavelengths of light.

The performance capture system 120 may include any number of sensor devices 120a, 120b, 120c to detect the electromagnetic radiation, e.g., light, emitted from the active markers. The sensor devices include various parameter components, including hardware, e.g., lenses, parameter control settings, and filters, and/or software that define intrinsic parameters for detection of electromagnetic radiation from the active markers. Intrinsic parameters may include focal length, optical center, principal point, skew of axis, lens distortion, etc.

The sensor device 120a, 120b, 120c may include a narrow-pass filter to detect a particular wavelength or range of wavelengths of the light emitted from the active markers. In some implementations, the sensor device 120a, 120b, 120c may be configured to detect multiple distinct wavelengths of light. For example, a sensor device may include filters to separately detect different wavelengths in an infrared range, or machine vision cameras for ultraviolet wavelengths. In some implementations, multiple sensor devices may be employed with individual sensor devices being dedicated to a wavelength of light.

In some implementations, the sensor device 120a, 120b, 120c include a global shutter CCD sensor. The sensor device 120a, 120b, 120c may be a standard camera having a single CCD sensor. In some implementations, one or more sensor devices 120a, 120b, 120c of the performance capture system 120 may include a visible light filter to block visible light and allow only particular wavelengths, e.g., short wavelength infrared light, to be detected by the camera sensor. Various cameras may be used by the performance capture systems, such as a computer vision camera and mono camera that is sensitive to infrared light (700 nm to 1 mm wavelength light), e.g., that exclude infrared blocking filters.

In some implementations, different sensor devices (e.g., cameras) may be devoted to particular wavelengths of light from different active markers. In some implementations, a sensor device of the performance capture system may include stacked filters that may be rotated or otherwise swapped, into place depending on the particular wavelength to be detected at any given moment. The performance capture system configured to capture alternating wavelengths of light enables encoding of more information based on the wavelength emitted. Swapping sensor filters isolates the particular wavelength being emitted at any given time. For example, filters may enable separation and detection of short infrared light, e.g., 950-1000 nm wavelength, special sensors heat-type filters may be used for long wave infrared, other filters may be used to detect 700-1000 nm wavelength light, and 280-650 nm visible light.

In some implementations, the sensor device(s) 120a, 120b, 120c may include one or more time of flight sensors to detect time of flight of the light. The time of flight sensors may infer position and volume of the light by multiple sensor devices detecting an arrival of the light at the respective sensor devices at different times. In determining an arrival time, such time of flight sensors may use an emittance time in which the active marker light is expected to emit light, as predetermined and directed by signals from the controller. The light data may be represented in three-dimensional (3-D) images. The capturing of light in "frames", such as illuminated frames, refers to time periods in which light arrives and is detected at the individual sensor devices. Accordingly, blank frames refer to time periods in which light is determined not to be present.

The data capture system 102 further includes a picture camera 114 to capture visible light of the live action scene 104, viewable by an observer such as the objects. In some implementations, the picture camera 114 may also capture data to assist in identification of the active markers, such as a color and/or shape of receptacles holding the active markers and/or detect passive markers. In some implementations, the picture camera 114 and performance capture camera may be synchronized. Data from the picture camera 114 and the performance capture camera may be combined to determine a marker arrangement 122.

The computing device 130 of the data capture system determines the marker arrangement 122 from data 124 representing positions of the detected markers. The marker data from the picture camera may also be used to match CG parameters for CG images with picture camera parameters, such as perspective, position, focal length, aperture, and magnification, of the CG images. In this manner the CG images may be created in an appropriate spatial relationship with the live action objects.

The computing device 130, via software running on the computing device, may further label the object and/or part of the object to which the group of active markers are attached. The computing device 130, via software running on the computing device, feeds marker data and/or object labels obtained from the detection of the active markers to the CG (computer graphics) rendering system 140 to be mapped to a virtual model using software of the CG rendering system 140. The CG rendering system 140 may represent the data in a virtual environment. For example, computer programs may be used by CG rendering system 140 to overlay information on top of movements of the actor 110 represented by the data.

The CG rendering system 140 may include computer processing capabilities, image processing capabilities, one or more processors, program code storage for storing program instructions executable by the one or more processors, as well as user input devices and user output devices (e.g., animation and rendering components of system 1000 described below with regard to FIGS. 9 and 10).

The recalibration system enables continuous recording of a live action scene and CG rendering when a sensor device is moved. The recalibration system resolves issues with sensor movement and miscalibration to provide for at least two sensor devices being calibrated at any given time and at least one overlapping field of view region between any two sensor devices. A sensor device may be intentionally moved to optimize the capture of marker data. For example, when objects with markers are moved in the scene to achieve a better capture position of a sensor, or to compensate for another moved sensor device, etc.

In some implementations, the sensor devices may be placed in various positions relative to other sensor devices, such as in opposite areas of the live action scene. The overlapping field of view may be any intersecting space, such fields of view that meet at a marker from sensor devices located in different positions.

Figure 2A:
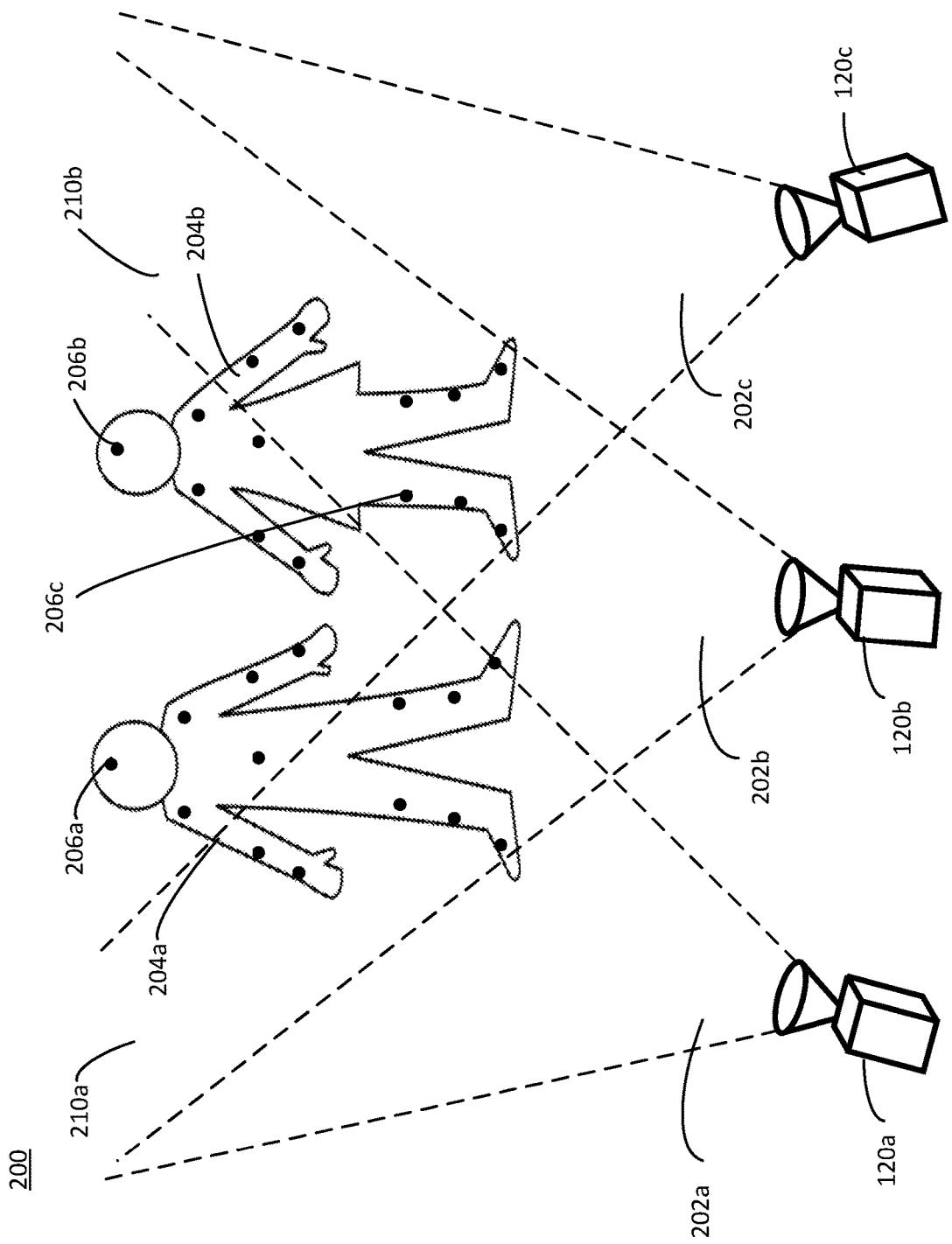
Figure 2B:
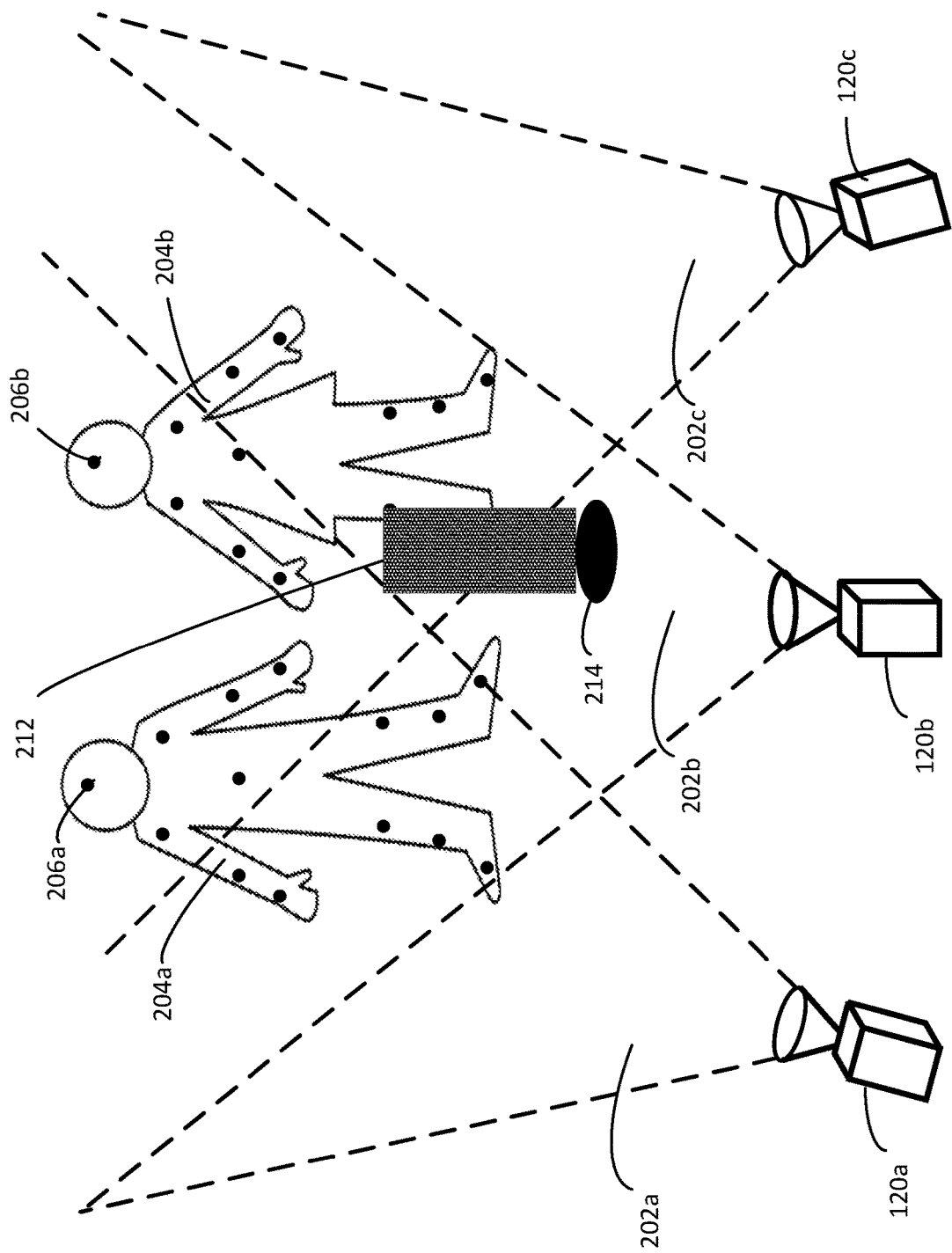
Figure 2C:
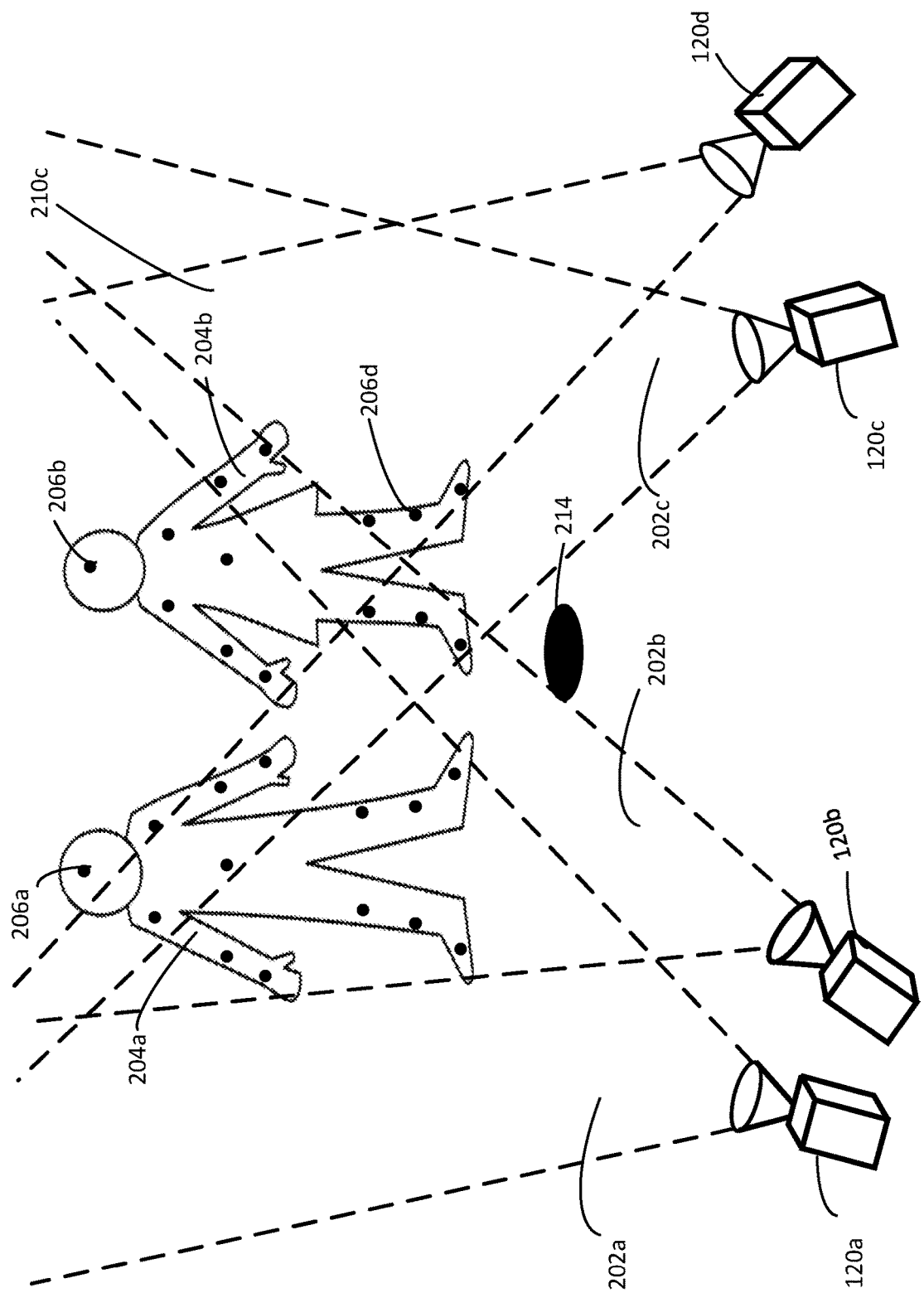

For illustration purposes of an example of resolving a problematic sensor device that is occluded at a recording site 200 is shown in FIGS. 2a-2c. FIG. 2a shows a plurality of sensor devices 120a, 120b, 120c recording electromagnetic radiation emitted from active markers within respective fields of view 202a, 202b, 202c of each of the sensor devices. In the illustrative scene, two people 204a, 204b are equipped with multiple active markers on various parts of the bodies. The active markers attached to the first person 204a includes a head active marker 206a (attached to the person's head or an article on the person's head)) and the active markers attached to second person 204b includes a head active marker 206b. The head active marker 206a is positioned within an overlapping field of view 210a of the sensor devices 120a and 120b. The head active marker 206b is positioned within an overlapping field of view 210b of the sensor devices 120b and 120c.

Prior to the recording of the live action scene, intrinsic parameters of the sensor devices 120a, 120b, 120c are set, the sensor devices are positioned in respective physical positions at the recording site and each are calibrated. For example, a production person may wave a wand with active markers attached to it through the volume of space in the live action scene. Each sensor device captures the light from the moving (waving) wand and this data is used to calibrate the sensor devices.

During the process of recording the live action scene, e.g., with a picture camera, in the example scenario shown in FIG. 2b an object 214 occludes a portion of the field of view 202b of sensor device 120b. For example, a prop from the live action scene may be moved to a position that blocks some or all of the field of view or one of the first person or second person may move in the live action scene to a location/position that is at least partially occluded by object 214. As a result of the occlusion, active markers, such as leg active marker 206c in a blocked segment 212 of the live action scene are captured by only sensor device 120c and not by sensor devices 120b. The marker data from sensor device 120c is insufficient to produce 3-D coordinates data for right leg active marker 206c in the previously overlapping segment. Some other active markers, such as head active marker 206b is still captured by sensor devices 120a and 120c.

Further to example scenario, in FIG. 2c, the sensor device 120b is moved to avoid the object 214. In addition, another sensor device 120d may be added to the recording site or moved from another position of the recording site, for example, to capture left leg active marker 206d in an overlapping portion 210c of the field of view of new sensor device 120d that corresponds with the field of view of sensor device 120c. Thus, as a result of the production change of the occlusion, the position of sensor device 120b is moved and sensor devi210ce 120d is added or relocated. All active markers in the live action scene are in at least two overlapping fields of view of at least two sensor devices. Sensor devices 120b is recalibrated and 120d freshly calibrated according to the recalibration processes described to make use of the marker data from these sensor devices in 3-D reconstruction.

In assessment of a suspect sensor device capturing of the unique active marker light pattern enables identification of which active markers are in each sensor device's field of view. For example, a suspect sensor device that fails to capture an identifying marker pattern and where one or more other sensor devices capture the light pattern, it may be found that the suspect sensor device is in a suboptimal position to capture the active marker (e.g., field of view is obscured as shown in FIG. 2b), has been unintentionally moves (e.g., bumped), or intentionally moved (e.g., to include the marker in its field of view). The problem may also arise from the suspect sensor device having experienced a change in intrinsic parameters that affects detection of the marker in its field of view. Intrinsic parameters, e.g., focal length, optical center, principal point, skew of axis, lens distortion, etc., may be recalibrated, such as by collecting new data to calculate a projection matrix (also known as a camera matrix) for the problematic sensor device.

In assessing a suspect sensor device that successfully captures an identifying marker pattern along with one or more other sensor devices (such that the active marker is in overlapping field of views of the sensor devices), it may be found that the suspect sensor device has lost calibration but has maintained its field of view on the active marker. For example, the suspect sensor device may have moved physical positions sufficient to throw off calibration yet the target active marker(s) is/are still in the field of view of the suspect sensor device. This sensor device may be recalibrated, such as via minor refinements.

Figure 3:
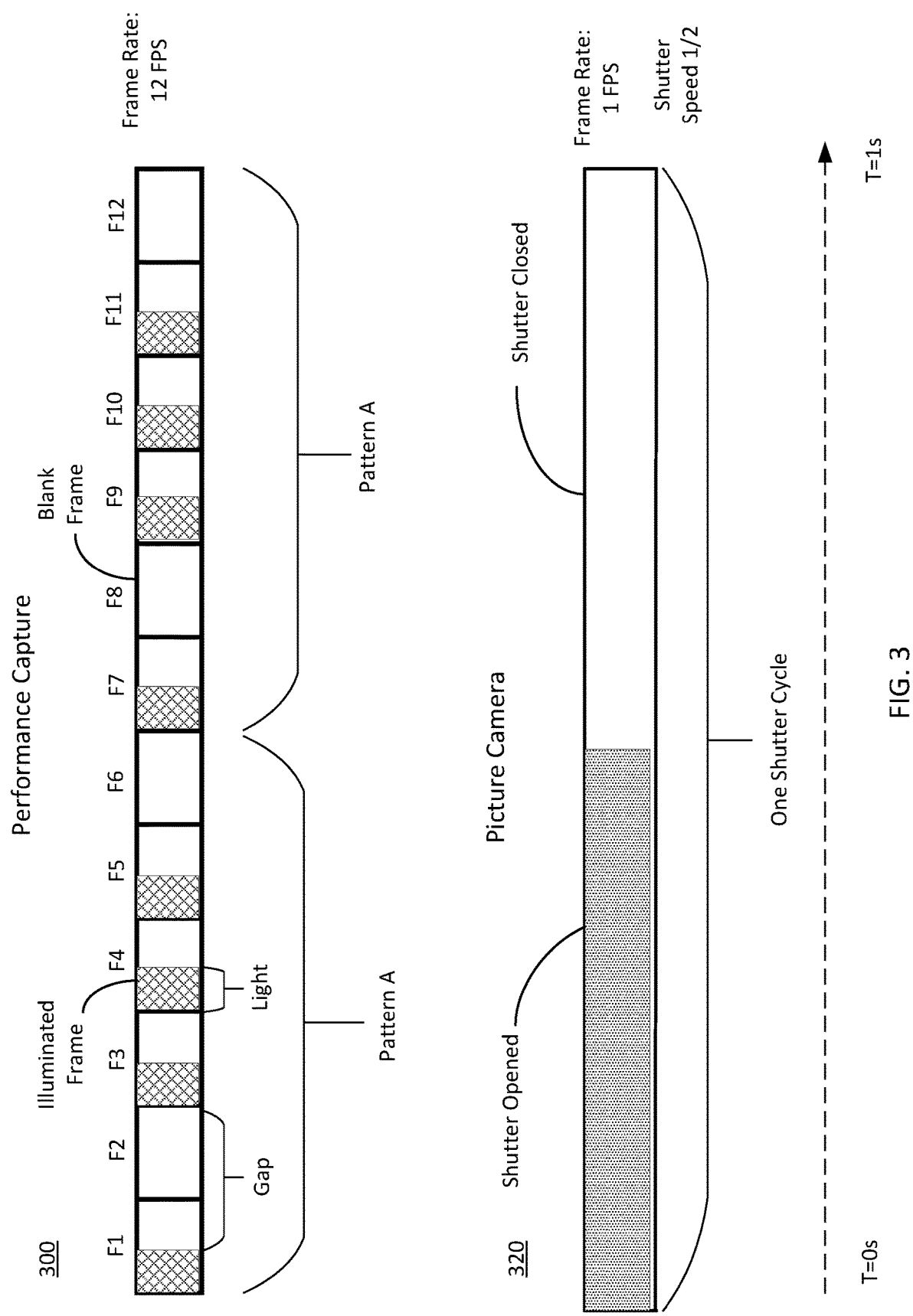
FIG. 3 is an illustration of exemplary captured frames with light patterns from an active marker or group of active markers, in accordance with some implementations.

FIG. 3 shows how a data capture of a sensor device is synchronized with a picture camera and active marker emitting patterns for use in identification of active markers and prediction of frames that capture the active marker. FIG. 3 illustrates examples of frames 300 within time slices of a video captured by a sensor device of the performance capture system (e.g., 120 in FIG. 1) and frames 320 within time slices of a video captured by a picture camera (e.g., 114 in FIG. 1) that captures visible light images, during a one second period of time. A time slice for the sensor device and picture camera is a period time in which an image is captured and includes the time between frames before the next frame is captured. In some implementations, a sensor device of the performance capture system may capture at a higher frame rate than the picture camera frame rate such that the signature pattern of light emitted from the active markers is detectable within a portion of a single cycle of the picture camera.

In the example illustrated in FIG. 3, a sensor device of a performance capture system may capture at a rate of 12 frames per second (fps) and a picture camera captures at a rate of 1 fps. In practice, the picture camera may shoot at various frame rates, such as 24 frames per second. The sensor device may also capture at various frame rates, such as 60 fps or 120 fps. In some implementations, the sensor device may run at a higher rate than the camera rate, e.g., 5 times the picture camera rate, such as 120 fps with a picture camera rate of 24 fps. The sensor device may run at such as high rate that a light pattern is virtually unnoticeable in the frames of the picture camera. For example, a user observing the scene may merely witness flickers of light or a seemingly continuous light source.

Pattern "A" consists of light periods and gap periods in which there is no light emitted between the light periods. This results in individual frames of the sensor device including illuminated frames in which light is detected from the active markers and blank frames in which no light is detected and it is determined that no light is present or emitted by an active marker. Pattern A, for example, includes an illuminated frame F1, blank frame F2, followed by three illuminated frames F3, F4, and F5, and ending with blank frame F6.

A single instance of the pattern can cover any distinguishable number of frames of the sensor device. In FIG. 3, the Pattern "A" is 6 (six) performance capture frames long and is repeated twice within a second of a video. Using a single pattern instance that encompasses a larger number of frames of the sensor device, enables exponentially greater number of combinations for the pattern. For example, a 5 frame pattern enables 32 distinguishable patterns to choose from for a given group of active markers. An 8 frame pattern allows for 256 different combinations. However, longer patterns may also increase the complexity of pattern and time for detection.

Further to the example in FIG. 3, a single time slice of the picture camera is shown with a shutter action speed of ½. The shutter is open for ½ of a second, which is half the duration of each shutter cycle of the picture camera. The shutter action of the picture camera includes opening and closing of the shutter during capture. A single cycle is made up of the capture period in which the picture camera is capturing while the shutter is open and the closed period when the camera is not capturing while the shutter is shut before the next frame begins.

In some implementations, the light pattern is detectable by the sensor device of the performance capture system within a single cycle of the picture camera. In the example shown, the sensor device may detect two repetitions of Pattern A within a single cycle of the picture camera.

In some implementations, multiple groups of active markers may be assigned to different signature patterns to enable the data capture system to distinguish between groups. In some implementation, a key sequence may be used in conjunction with the pattern signals. The key sequence may be a code sent by the signal controller 116 to isolate the pattern signal for a given group of active markers. A control unit may be programmed to detect the key sequence and ignore other interference signals in the same or similar frequency of the signal controller 116.

The key sequence may be used to define a group of active markers and its pattern signals and for different groups to separate their assigned signature patterns. For example, two or more groups of active markers may be assigned respective signature light patterns with different key sequence for each group. A control unit may be programmed to recognize different particular key sequences as assigned to particular groups of active markers under the control unit's control. The control unit may receive an initial key sequence for a particular group, which triggers the control unit to apply the pattern signals that follows to the particular group.

The computing device 130, via software running on the computing device, may determine the key sequences for various groups of active markers. In some implementations, various control units may be programmed to recognize the initial and/or terminal key sequences assigned to various groups under the respective control units' control. In this manner, different control units may be activated under particular initial key sequences. The terminal key sequence may indicate to the control unit that the pattern signals have ended. In some implementations, the terminal key sequence may indicate to the control unit to prepare to detect another initial key sequence for other pattern signals intended for another group of active markers.

Key sequences, initial calibration key sequences and terminal calibration key sequences, may also be employed to signify calibration signals during synchronization of components. Thus, various groups of active markers may be sequentially triggered during synchronization to determine accuracy in timing of the light from the various groups.

In various implementations, additional signals may be inserted to provide additional commands or information. For example, extra signals may be inserted prior to the initial key sequence or between the initial key sequence and the pattern signals. Likewise, extra signals may be inserted between the pattern signals and the terminal key sequence or after the terminal key sequence. In other implementations, the initial key sequence immediately precedes the pattern signals and the terminal key sequence immediately follows the pattern signals, with no extra signals in between.

Figure 4:
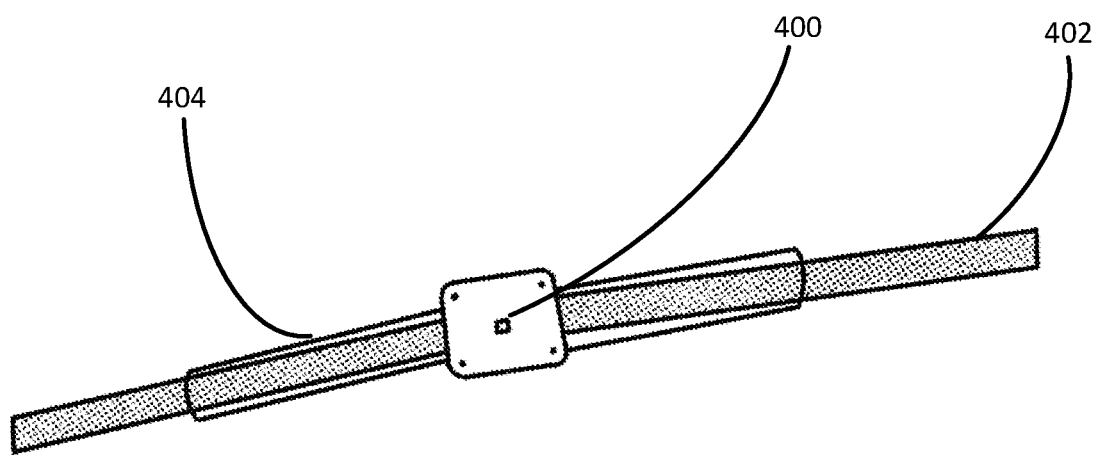
FIG. 4 is an example of an active marker on a strand, in accordance with some implementations.

As shown in FIG. 4, in some implementations an active marker 400 may be coupled to a strand 402. A protective covering 404, e.g., heat shrink tubing, may cover internal wires at the area that the active marker is attached to the strand and the general area of the receptacle once the active marker is inserted into the receptacle. The protective covering 404 may be provided to insulate, protect and seal the active marker 400 with the strand 402. The strand 402 may be a flexible material. The strand may contain a wire or be a naked wire. The wire typically includes a highly conductive element, such as copper, silver, gold, or aluminum, and may be uncoiled, stranded, solid, braided, etc. The strand provides a pathway for electronic communication between various components of the data capture components on the object. For example, the strand may be a conduit of electrical signals between components, such as from/to one or more control units and active markers, between the active markers within a group, and/or between groups of active markers with other groups of active markers.

The active marker 400 may include one or more light sources, such as an LED or an array of a plurality of LED's (e.g., a bundle of three LED's). Multiple active markers 400 may be coupled to strand 402 in the manner shown in FIG. 4. A group of a plurality of active markers 400 may be coupled to the strand 402, such as 2 to 15, for example, 8 active markers on a strand. Each active marker on a single strand 402 may emit light according to the same pattern.

Figure 5:
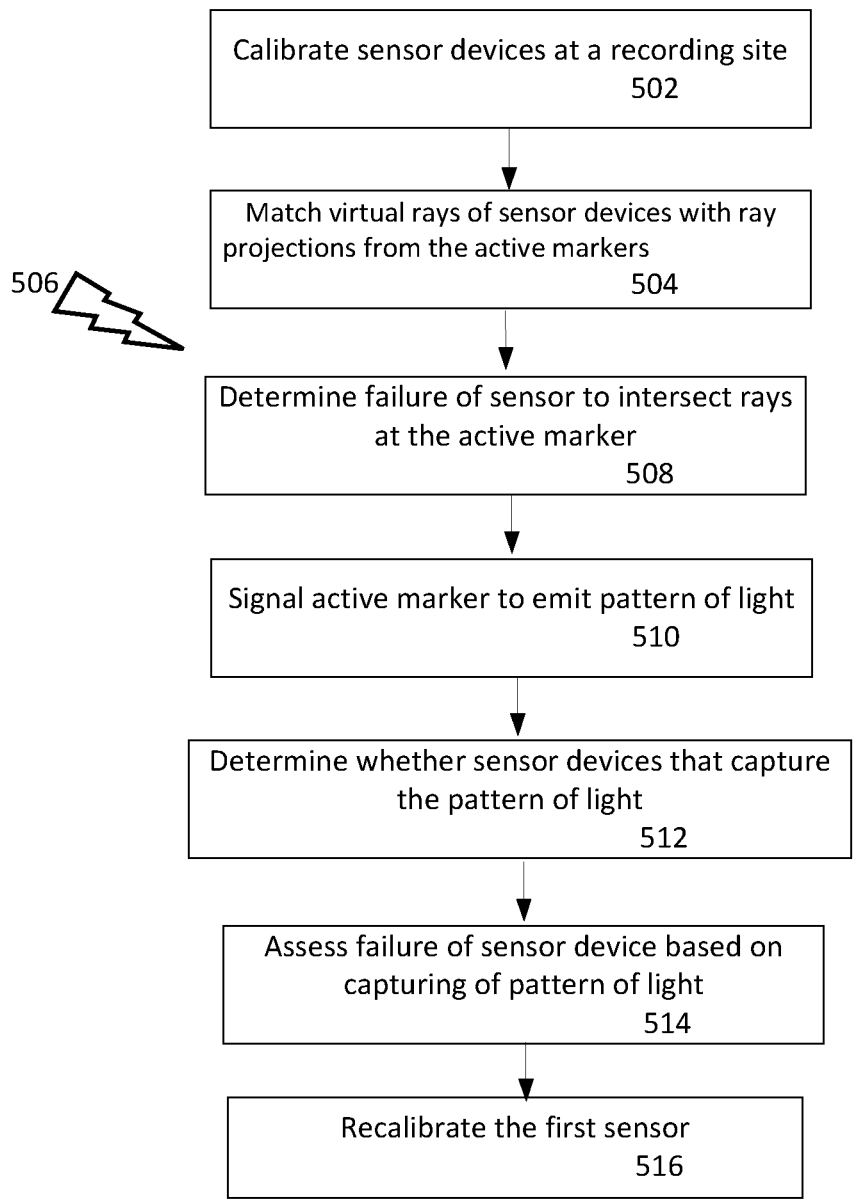
FIG. 5 is a flowchart of an example method to recalibrate sensor devices, in accordance with some implementations.

As shown in the flowchart in FIG. 5, an example method 500 is provided for recalibrating a sensor device to capture active marker light during a recording associated with a virtual production. In block 502, a plurality of sensor devices are calibrated in an initial physical position at a recoding site. In block 504, virtual rays of sensor devices are matched with virtual ray projections from one or more active markers. Intersection of the rays is an indication of accurately calibrated sensor devices. Where at least two calibrated sensor devices have an active marker in its field of view, 3-D coordinates are determined from the 2-D data in the images of the active markers.

Where a production change 506 occurs, one or more sensor devices may fail to provide intersecting rays at the active marker, in block 508. To determine whether the problematic sensor device and other sensor devices are capturing the active marker, the active marker is signaled to emit a unique display of light in block 510. In block 512 it is determined whether the sensor devices are capturing the active marker light as shown in further detail in FIG. 6 described below. In block 514 an assessment is made of the failure to match rays based on which, if any, of the sensor devices are capturing the unique pattern of light from the active marker. In block 516, the problematic sensor device is recalibrated, as shown in further detail in FIG. 7 described below.

In some implementations, a new sensor device may be added to a recording site and calibrated according to the present recalibration techniques. In the case of a newly added sensor device, calibration may be performed according to the method in FIG. 5 from blocks 506, where the production site change includes addition of the new sensor device, through block 516, where fresh calibration is performed according to the recalibration processes described herein.

Figure 6:
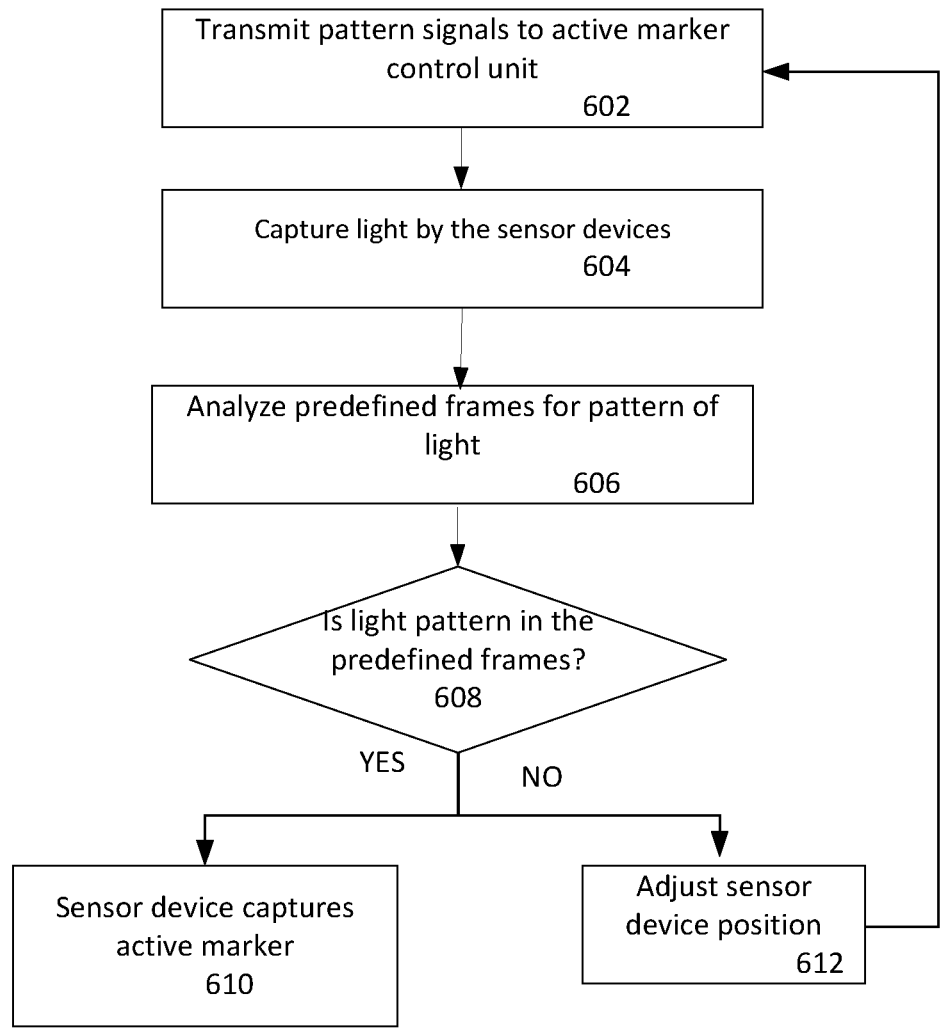
FIG. 6 is a flowchart of an example method for using light patterns to identify active markers captured by sensor devices, in accordance with some implementations.

As shown in the flowchart in FIG. 6, active marker identification process may be employed to recognize particular active markers or groups of active markers by unique light patterns from the active markers. Various active markers can be made to emit light according to light patterns at certain times, such as all active markers may fire at the same time, particular active markers may be isolated to emit a pattern of light without other active markers emitting light, groups may fire sequentially, assortments of groups may collectively fire together, e.g., all groups on a particular object or all groups in a sector of the live action scene, etc.

In some implementations, each active marker or strand of active markers in a group on an object may be labeled as to the part of the object that the strand is attached, such as an arm, leg, head, back, front torso, and waist of an actor. In some implementations, eight strands are strung on an actor.

In block 602, a signal controller transmits pattern signals, e.g., in the form of radio frequency signals, to a receiver for a target active marker. A receiver of the active marker or a main control unit receives the signals and modulates power to the active marker(s) according to the pattern. Light is emitted from the target active marker. In block 604, a sensor device captures light from the live action scene in captured frames by the sensor device of the performance capture system.

In some implementations, one or more particular sensor devices of the performance capture system may be assigned to track a group of markers. In block 606, the predefined frames that are expected by the software to include the pattern of light of the assigned sensor devices are analyzed, such as by computing device 130 in FIG. 1 and software running on the computing device. The frames that depict the light pattern include a sequence of illuminated and blank frames.

In decision block 608, it is determined whether the data in the predefined frames are consistent with the light pattern. If the predefined frames do not include the signature pattern, the sensor device in block 612, may be repositioned to change a field of view to include the target active marker(s). The process may return back to block 602 to determine if the adjustment to the sensor device results in capture of the target active marker. If the pattern is detected in the predefined frames of a sensor device, in block 610 it is determined that the field of view of the sensor device is correctly positioned to capture the target active marker. Identified group of active markers may be labeled and tracked as the visual production proceeds. In some implementations, the identified group of active markers may be used as a spatial reference to identify further active marker groups.

Figure 7:
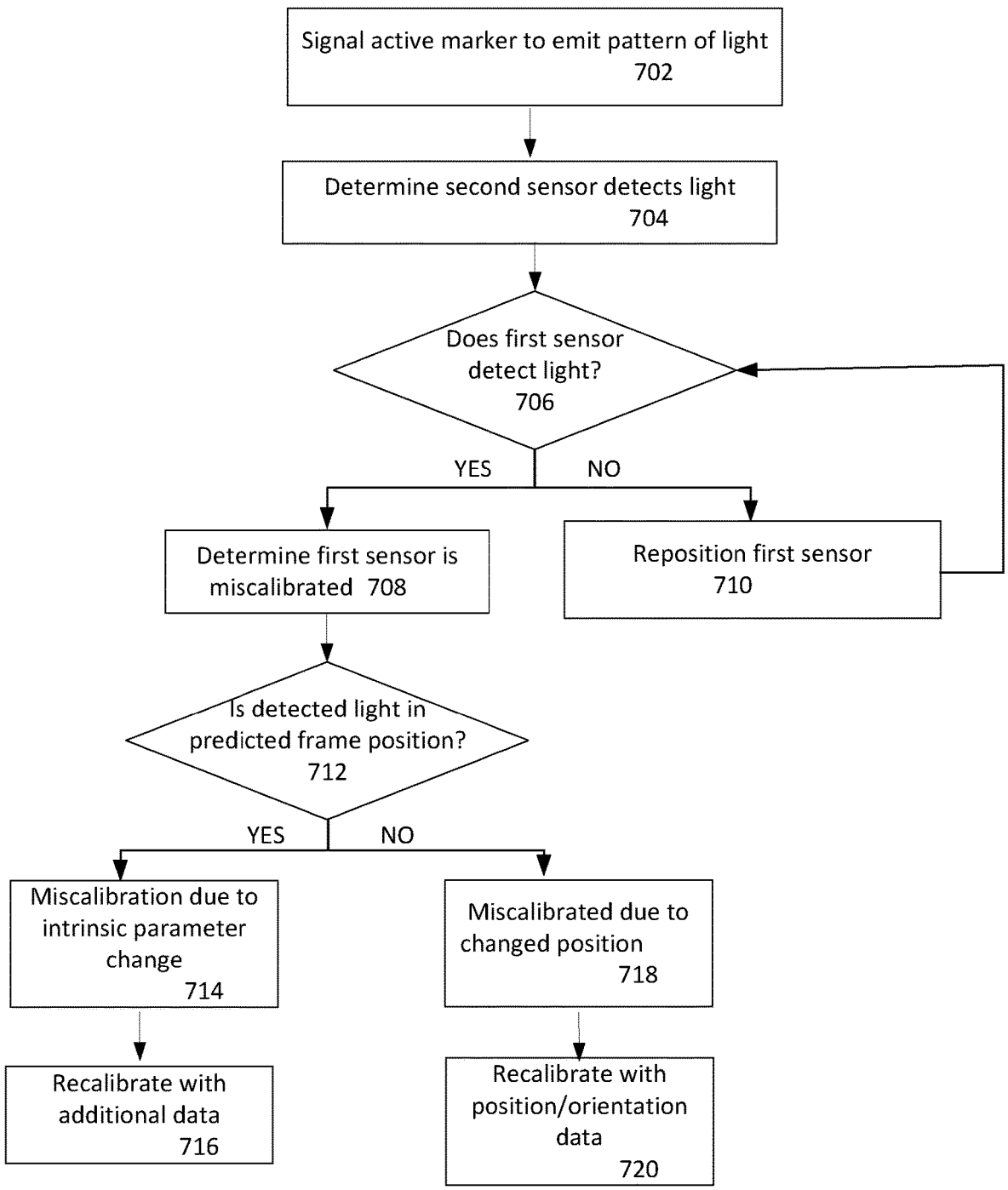
FIG. 7 is a flowchart of an example method to recalibrate sensor devices by assessing miscalibration problems, in accordance with some implementations.

FIG. 7 is a flowchart of an example methods to recalibrate a sensor device that is miscalibrated. In block 702, a target active marker is signaled to emit a unique display of light. In some implementations, a group of target active markers emit the unique display of light. In block 704 it is determined that the second sensor devices captures the target active marker. In decision block 706 it is determined whether the first (suspect) sensor device also captures the target active marker. If the first sensor device fails to capture the target active marker, the first sensor device is repositioned in block 710 and the process repeats to block 706 to determine if the repositioning fixed the problem of capturing the target active marker. If the target active marker is captured, in block 708 it is determined that the first sensor device is miscalibrated, based on the failed matching of rays.

In block 712, an assessment of the problem is continued by determining whether the position of the detected light from the target active marker by the first sensor device is in the expected position in the frames. As described above, synchronization of the sensor devices with other components, such as a signal controller and picture camera, may enable prediction of frames depicting the active marker. The position in the frames from the first sensor device may also be compared to the calibrated second sensor device frames. Furthermore, the spatial position of the target active marker may be compared to the position of other active markers detected by the sensor devices to extract an expected position for the target active marker.

In block 714, if, for example, the marker position is in the expected position in the predicted frames, then it may be found that miscalibration is due to a change in one or more intrinsic parameters of the sensor device. However, in some implementations, an alteration of an intrinsic parameter and depending on the intrinsic parameter that is changed, may also result in a marker position to be off in position in the predicted frame and/or in a different frame that the predicted frame. Recalibration due to intrinsic parameter changes, in block 716 may be performed using additional data. For example, to solve for intrinsic based miscalibrations, additional data captured from identified markers of the scene in a frame may be used for an optimization problem, e.g., to complete a projection matrix. The system may retrieve such additional data by identification of each marker and knowledge of which frames should include the identified marker.

In block 718, if the marker position is shown to be offset from the expected position in the predicted frames, it may be found that miscalibration is due to a change in physical position of the sensor device, e.g., bumped. Recalibration due to physical position changes, in block 720 may be performed using the identification of the marker to extract the new position and orientation of the moved sensor device. In one example, perspective-n-point formula technique is used with 3-D coordinates from two or more calibrated sensor devices and corresponding 2-D data in the uncalibrated sensor device. New position data for the uncalibrated sensor device may be calculated.

In some implementations, a new sensor device may be added to a recording site and calibrated according to the present recalibration techniques. In the case of a newly added sensor device, calibration may be performed according to the method in FIG. 7, where fresh calibration is performed according to the recalibration processes described herein It is possible to employ other methods of recalibrating sensor devices using data known according to the described methods, without stopping the recording. For example, in implementations in which an active marker in a group of markers is detected by a calibrated sensor device and the problematic sensor device picks up on the other markers in the group, the recalibration system may use the known distance and spatial orientation between markers in a known group of markers to determine a new position of the sensor device.

Although the steps in FIGS. 5, 6, and 7 may be presented in a specific order, this order may be changed in different particular implementations. In some particular implementations, multiple steps shown as sequential in this specification can be performed at the same time.

Example Computer System

Figure 8:
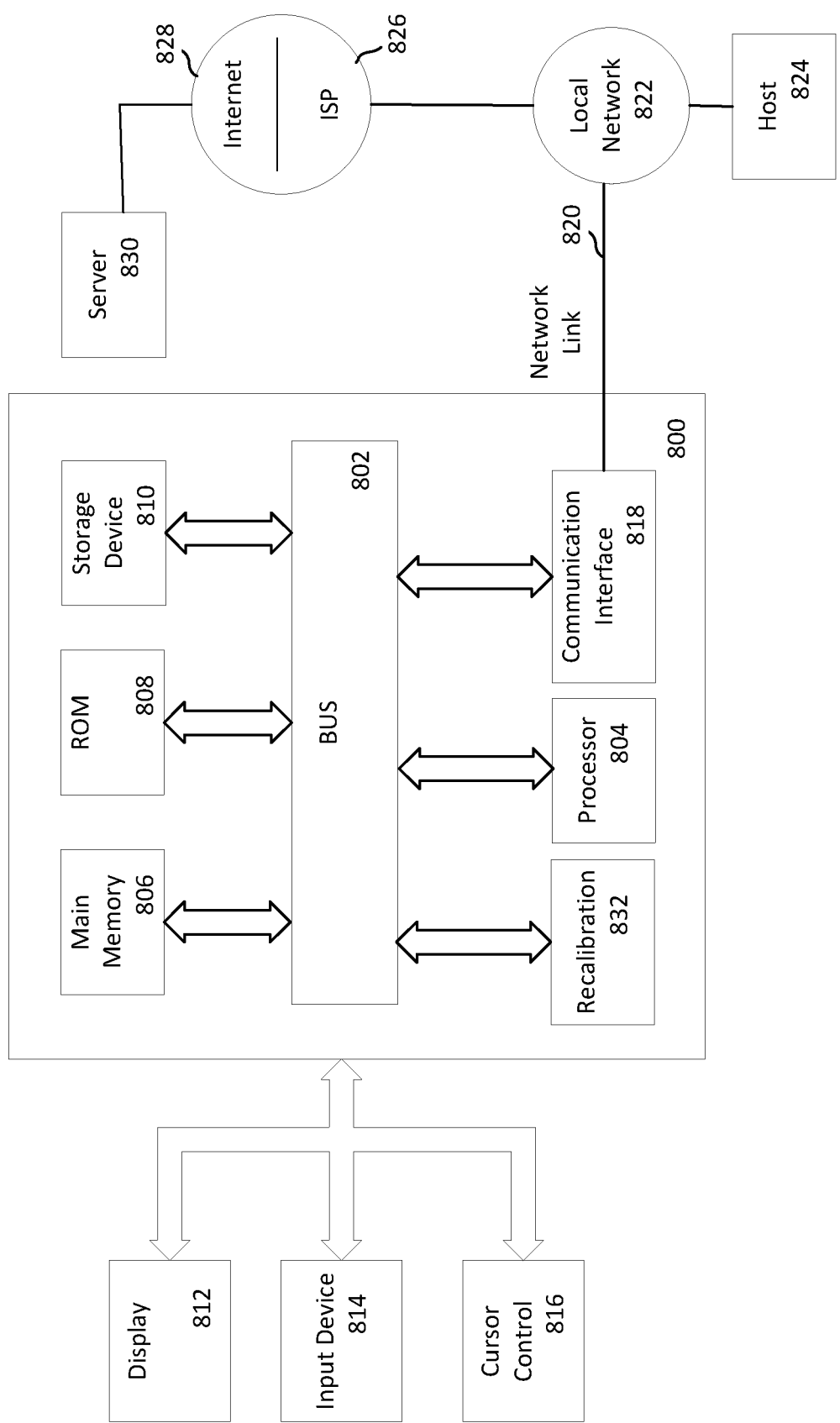
FIG. 8 is a block diagram illustrating an example computer system upon which computer systems of the recalibration system illustrated in FIG. 1 may be implemented, in accordance with some implementations.

As shown in FIG. 8, a computer system 800 may be employed upon which the performance capture system (such as 120 in FIG. 1) and/or the CG rendering system (such as 126 in FIG. 1) may be implemented. The computer system 800 includes a bus 802 or other communication mechanism for communicating information, and a processor 804 coupled with the bus 802 for processing information. The processor 804 may be, for example, a general purpose microprocessor.

The computer system 800 also includes a main memory 806, such as a random access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 002 for storing information and instructions.

A recalibration module 832 of the computing system 800 performs the various recalibration processes described herein such as described in FIGS. 5-7. Recalibration processes include detecting potentially problematic sensor devices, assessing sensor device problems, and recalibrating the problematic sensor devices.

The computer system 800 may be coupled via the bus 802 to a display 812, such as a computer monitor, for displaying information to a computer user. An input device 814, including alphanumeric and other keys, is coupled to the bus 802 for communicating information and command selections to the processor 804. Another type of user input device is a cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement the techniques described herein using customized hard-wired logic, one or more ASICs or FPGAs, firmware and/or program logic which in combination with the computer system causes or programs the computer system 800 to be a special-purpose machine. According to one implementation, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 810. Volatile media includes dynamic memory, such as the main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may initially be carried on a magnetic disk or solid state drive of a remote computer. The remote computer can load the instructions into its dynamic memory and send the instructions over a network connection. A modem or network interface local to the computer system 800 can receive the data. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the worldwide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), the network link 820, and communication interface 818. In the Internet example, a server 830 might transmit a requested code for an application program through the Internet 828, ISP 826, local network 822, and communication interface 818. The received code may be executed by the processor 804 as it is received, and/or stored in the storage device 810, or other non-volatile storage for later execution.

For example, FIG. 8 illustrates the example visual content generation system 800 as might be used to generate imagery in the form of still images and/or video sequences of images. The visual content generation system 800 might generate imagery of live action scenes, computer generated scenes, or a combination thereof. In a practical system, users are provided with tools that allow them to specify, at high levels and low levels where necessary, what is to go into that imagery. and might use the visual content generation system 800 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 800 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimension of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some implementations, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

Example Live Action Capture System

Figure 9:
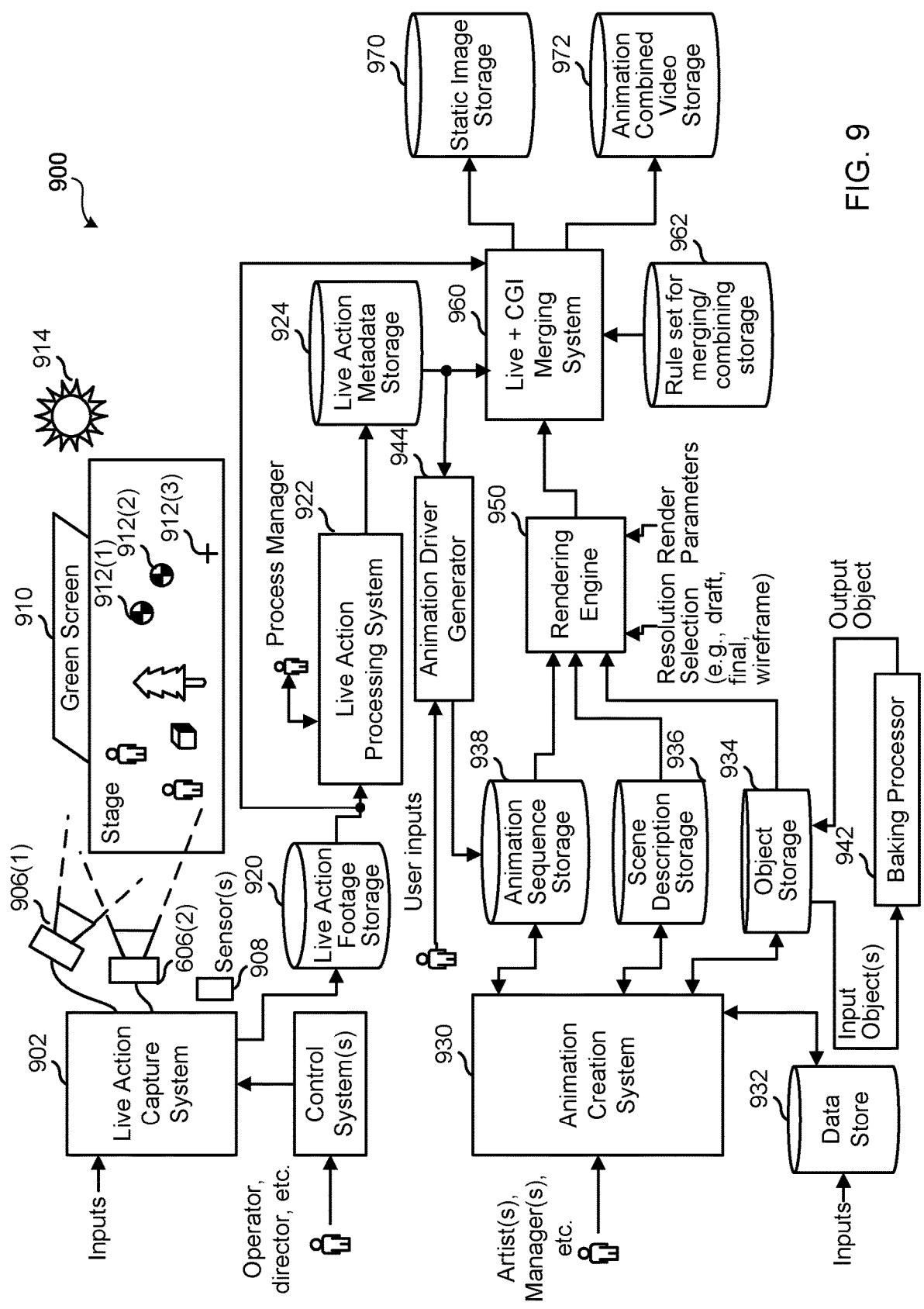
FIG. 9 illustrates an example content generation system as might be used to generate imagery in the form of still images and/or video sequences of images, in accordance with some implementations.

As illustrated in FIG. 9, a live action capture system 902 captures a live scene that plays out on a stage 904. The live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On the stage 904, there might be human actors, animal actors, inanimate objects, background objects, and possibly an object such as a green screen 910 that is designed to be captured in a live scene recording in such a way that it is easily overlaid with computer-generated imagery. The stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, the live action capture system 902 might output live action footage to a live action footage storage 920. A live action processing system 922 might process live action footage to generate data about that live action footage and store that data into a live action metadata storage 924. The live action processing system 922 might include computer processing capabilities, image processing capabilities, one or more processors, program code storage for storing program instructions executable by the one or more processors, as well as user input devices and user output devices, not all of which are shown. The live action processing system 922 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 914, as that might be useful in post-processing to match computer-generated lighting on objects that are computer-generated and overlaid on the live action footage. The live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of the visual content generation system 900. The animation creation system 930 might include computer processing capabilities, image processing capabilities, one or more processors, program code storage for storing program instructions executable by the one or more processors, as well as user input devices and user output devices, not all of which are shown. The animation creation system 930 might be used by animation artists, managers, and others to specify details, perhaps programmatically and/or interactively, of imagery to be generated. From user input and data from a database or other data source, indicated as a data store 932, the animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 930 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 932 might be used to drive object presentation. For example, if an artist is creating an animation of a spaceship passing over the surface of the Earth, instead of manually drawing or specifying a coastline, the artist might specify that the animation creation system 930 is to read data from the data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene, and generate corresponding animation parameters to be stored in the animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 922. The animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 950 might include computer processing capabilities, image processing capabilities, one or more processors, program code storage for storing program instructions executable by the one or more processors, as well as user input devices and user output devices, not all of which are shown.

The visual content generation system 900 can also include a merging system 960 that merges live footage with animated content. The live footage might be obtained and input by reading from the live action footage storage 920 to obtain live action footage, by reading from the live action metadata storage 924 to obtain details such as presumed segmentation in captured images segmenting objects in a live action scene from their background (perhaps aided by the fact that the green screen 910 was part of the live action scene), and by obtaining CGI imagery from the rendering engine 950.

A merging system 960 might also read data from a rulesets for merging/combining storage 962. A very simple example of a rule in a ruleset might be "obtain a full image including a two-dimensional pixel array from live footage, obtain a full image including a two-dimensional pixel array from the rendering engine 950, and output an image where each pixel is a corresponding pixel from the rendering engine 950 when the corresponding pixel in the live footage is a specific color of green, otherwise output a pixel value from the corresponding pixel in the live footage."

The merging system 960 might include computer processing capabilities, image processing capabilities, one or more processors, program code storage for storing program instructions executable by the one or more processors, as well as user input devices and user output devices, not all of which are shown. The merging system 960 might operate autonomously, following programming instructions, or might have a user interface or programmatic interface over which an operator can control a merging process. In some implementations, an operator can specify parameter values to use in a merging process and/or might specify specific tweaks to be made to an output of the merging system 960, such as modifying boundaries of segmented objects, inserting blurs to smooth out imperfections, or adding other effects. Based on its inputs, the merging system 960 can output an image to be stored in a static image storage 970 and/or a sequence of images in the form of video to be stored in an animated/combined video storage 972.

Thus, as described, the visual content generation system 900 can be used to generate video that combines live action with computer-generated animation using various components and tools, some of which are described in more detail herein. While the visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

CONCLUSION

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain implementations require at least one of A, at least one of B and at least one of C each to be present.

The use of any and all examples, or exemplary language (e.g., "such as") provided herein, is intended merely to better illuminate implementations of the invention and does not pose a limitation on the scope of the invention unless otherwise claimed. No language in the specification should be construed as indicating any non-claimed element as essential to the practice of the invention.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further implementations can be envisioned to one of ordinary skill in the art after reading this disclosure. In other implementations, combinations or sub-combinations of the above-disclosed invention can be advantageously made. The example arrangements of components are shown for purposes of illustration and it should be understood that combinations, additions, re-arrangements, and the like are contemplated in alternative implementations of the present invention. Thus, while the invention has been described with respect to exemplary implementations, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

Although the description has been described with respect to particular implementations thereof, these particular implementations are merely illustrative, and not restrictive. For example, in some implementations, a plurality of picture cameras may be used to capture images from various angles of the same live action scene or to capture different portions of the live action scene and the images may be stitched together or particular images selected for the output image. In various implementations, additional equipment, techniques and technologies may be employed to accommodate requirements of a particular virtual production and live action scene, such as underwater scenes.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a computer-readable storage medium for use by or in connection with the instruction execution system, apparatus, system, or device. Particular implementations can be implemented in the form of control logic in software or hardware or a combination of both. The control logic, when executed by one or more processors, may be operable to perform that which is described in particular implementations.

Particular implementations may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular implementations can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above. A computer readable medium can comprise any medium for carrying instructions for execution by a computer, and includes a tangible computer readable storage medium and a transmission medium, such as a signal transmitted over a network such as a computer network, an optical signal, an acoustic signal, or an electromagnetic signal.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

We claim:

1. A method for recalibrating a sensor device to capture light from an active marker during a recording for a virtual production, the method comprising:
   providing a first sensor device, a second sensor device, and a third sensor device, each of the sensor devices being initially calibrated at a recording site to capture marker data for three-dimensional (3-D) coordinates of an active marker;
   after a recording site change, determining a failure of virtual rays projected from the first sensor device to match with virtual rays projected from the active marker;
   in response to determining the failure, signaling for the active marker to emit a unique display of light;
   assessing the failure based on at least one of the first sensor device, the second sensor device, or the third sensor device capturing the unique display of light; and
   without stopping the recording, recalibrating the first sensor device based on the assessment, using 3-D coordinates of the active marker from marker data of the second sensor device and the third sensor device.

2. The method of claim 1, wherein assessing the failure includes:
   detecting that the first sensor device, the second sensor device, and the third sensor device each capture the unique display of light; and
   determining that the first sensor device is miscalibrated and the active marker is in a field of view of the first sensor device.

3. The method of claim 2, wherein the recording site change includes the first sensor device being moved to a changed physical position.

4. The method of claim 3, wherein the recalibrating includes calculating the changed physical position of the first sensor device based by applying the 3-D coordinates of the active marker and corresponding two-dimensional (2-D) coordinates of the first sensor device to a perspective-n-point pose problem formula.

5. The method of claim 1, wherein assessing the failure includes:
   detecting that the second sensor device or the third sensor device captures the unique display of light and the first sensor device fails to capture the unique display of light; and
   repositioning the first sensor device to a changed physical position to have a field of view region including the active marker and overlapping with a field of view of the second sensor device or the third sensor device, thereby causing the first sensor device to be miscalibrated.

6. The method of claim 5, wherein the recording site change includes an initial field of view of the first sensor device in an initial sensor position becoming at least partially occluded.

7. The method of claim 1, wherein the recording site change is a modification of an intrinsic parameter of the first sensor device.

8. The method of claim 1, wherein assessing the failure further includes:
   identifying the active marker by the marker data representing the unique display of light emitted by the active marker and captured in particular frames by the first sensor device, the second sensor device, and the third sensor device, when each sensor device is initially calibrated.

9. A system for recalibrating a sensor device to capture active marker light during a recording associated with a virtual production, the system comprising:
   a first sensor device, a second sensor device, and a third sensor device, each of the sensor devices being initially calibrated at a recording site to capture marker data for three-dimensional (3-D) coordinates of an active marker;
   a plurality of active markers;
   at least one computing device comprising one or more processors and a tangible processor-readable storage device including instructions for:
      after a recording site change, determining a failure of virtual rays projected from the first sensor device to match with virtual rays projected from the active marker;
      in response to determining the failure, signaling for the active marker to emit a unique display of light;
      assessing the failure based on at least one of the first sensor device the second sensor device, or the third sensor device capturing the unique display of light; and
      without stopping the recording, recalibrating the first sensor device based on the assessment, using 3-D coordinates of the active marker from marker data of the second sensor device and the third sensor device.

10. The system of claim 9, wherein assessing the failure includes:
   detecting the first sensor device, the second sensor device, and the third sensor device each capture the unique display of light; and
   determining that the first sensor device is miscalibrated and the active marker is in a field of view of the first sensor device.

11. The system of claim 9, wherein the recording site change includes the first sensor device being moved to a changed physical position, and wherein the recalibrating includes calculating the changed physical position of the first sensor device based by applying the 3-D coordinates of the active marker and corresponding two-dimensional (2-D) coordinates of the first sensor device to a perspective-n-point pose problem formula.

12. The system of claim 9, wherein the recording site change includes a field of view of the first sensor device in an initial sensor position becoming at least partially occluded and wherein assessing the failure further comprises:
   detecting that the second sensor device or the third sensor device captures the unique display of light and the first sensor device fails to capture the unique display of light; and
   repositioning the first sensor device to a changed physical position to have a field of view region including the active marker and overlapping with a field of view of the second sensor device or the third sensor device, thereby causing the first sensor device to be miscalibrated.

13. The system of claim 9, wherein the recording site change is a modification of an intrinsic parameter of the first sensor device.

14. The system of claim 9, wherein assessing the failure further includes:
   identifying the active marker by the marker data representing the unique display of light emitted by the active marker and captured in particular frames by the first sensor device and second sensor device.

15. A non-transitory computer-readable storage medium carrying program instructions thereon for recalibrating a sensor device to capture active marker light during a recording associated with a virtual production, the program instructions when executed by one or more processors cause the one or more processors to perform operations comprising:
   receiving initial calibration information for a first sensor device, a second sensor device, and a third sensor device, each of the sensor devices being initially calibrated at a recording site to capture marker data for three-dimensional (3-D) coordinates of an active marker;
   after a recording site change, determining a failure of virtual rays projected from the first sensor device to match with virtual rays projected from the active marker;
   in response to determining the failure, signaling for the active marker to emit a unique display of light;
   assessing the failure based on at least one of the first sensor device, the second sensor device, or the third sensor device capturing the unique display of light; and
   without stopping the recording, recalibrating the first sensor device based on the assessment, using 3-D coordinates of the active marker from marker data of the second sensor device and the third sensor device.

16. The computer-readable storage medium of claim 15, wherein assessing the failure includes:
   detecting the first sensor device, the second sensor device, and the third sensor device each capture the unique display of light; and
   determining that the first sensor device is miscalibrated and the active marker is in a field of view of the first sensor device.

17. The computer-readable storage medium of claim 15, wherein the recording site change includes the first sensor device being moved to a changed physical position, and wherein the recalibrating includes calculating the changed physical position of the first sensor device based by applying the 3-D coordinates of the active marker and corresponding two-dimensional (2-D) coordinates of the first sensor device to a perspective-n-point pose problem formula.

18. The computer-readable storage medium of claim 15, wherein the recording site change includes a field of view of the first sensor device in an initial sensor position becoming at least partially occluded and wherein assessing the failure further comprises:
   detecting that the second sensor device or the third sensor device captures the unique display of light and the first sensor device fails to capture the unique display of light; and
   repositioning the first sensor device to a changed physical position to have a field of view region including the active marker and overlapping with a field of view of the second sensor device or the third sensor device, thereby causing the first sensor device to be miscalibrated.

19. The computer-readable storage medium of claim 15, wherein the recording site change is a modification of an intrinsic parameter of the first sensor device.

20. The computer-readable storage medium of claim 15, wherein assessing the failure further includes:
   identifying the active marker by the marker data representing the unique display of light emitted by the active marker and captured in particular frames by the first sensor device, the second sensor device, and the third sensor device, when each sensor device is initially calibrated.

* * * * *